United States Patent
Koch et al.

(10) Patent No.: US 10,233,326 B2
(45) Date of Patent: Mar. 19, 2019

(54) POLYAMIDE MOULDING COMPOUND, MOULDED ARTICLE PRODUCED HEREFROM AND ALSO PURPOSES OF USE

(71) Applicant: EMS-PATENT AG, Domat/Ems (CH)

(72) Inventors: Felix Koch, Pfäffikon (CH); Botho Hoffmann, Domat/Ems (CH)

(73) Assignee: EMS-PATENT AG, Domat/Ems (CH)

(*) Notice: Subject to any disclaimer, the term of this patent is extended or adjusted under 35 U.S.C. 154(b) by 408 days.

(21) Appl. No.: 14/935,642

(22) Filed: Nov. 9, 2015

(65) Prior Publication Data

US 2016/0130439 A1 May 12, 2016

(30) Foreign Application Priority Data

Nov. 11, 2014 (EP) .................................. 14192659

(51) Int. Cl.
C08L 77/06 (2006.01)
C08G 69/26 (2006.01)
C08K 7/14 (2006.01)

(52) U.S. Cl.
CPC .............. *C08L 77/06* (2013.01); *C08G 69/26* (2013.01); *C08G 69/265* (2013.01); *C08K 7/14* (2013.01)

(58) Field of Classification Search
CPC ....... C08G 69/26; C08G 69/265; C08L 18/60; C08L 18/603; C08L 77/06; C08K 7/14
See application file for complete search history.

(56) References Cited

U.S. PATENT DOCUMENTS

| | | | |
|---|---|---|---|
| 2,130,948 | A | 9/1938 | Carothers |
| 8,741,991 | B2 | 6/2014 | Yamamoto et al. |
| 9,346,952 | B2 | 5/2016 | Aepli et al. |
| 2009/0099318 | A1 | 4/2009 | Miyamoto et al. |
| 2010/0331461 | A1 | 12/2010 | Yamamoto et al. |
| 2011/0020628 | A1 | 1/2011 | Fukudome et al. |
| 2012/0016077 | A1* | 1/2012 | Kato .................... C08G 69/26 524/606 |
| 2014/0066560 | A1* | 3/2014 | Stoppelmann .......... C08K 7/14 524/407 |
| 2014/0179849 | A1 | 6/2014 | Aepli et al. |
| 2014/0179850 | A1 | 6/2014 | Aepli et al. |

FOREIGN PATENT DOCUMENTS

| | | |
|---|---|---|
| CN | 101372555 A | 2/2009 |
| CN | 102395626 A | 3/2012 |
| CN | 102449029 A | 5/2012 |
| CN | 103665831 A | 3/2014 |
| CN | 103881367 A | 6/2014 |
| EP | 1 757 636 A1 | 2/2007 |
| EP | 2 687 555 A1 | 1/2014 |
| EP | 2 746 342 A1 | 6/2014 |
| JP | 2004-075932 A | 3/2004 |
| JP | 2010-031179 A | 2/2010 |
| JP | 2010-270308 A | 12/2010 |
| WO | WO 2009/095441 A1 | 8/2009 |

OTHER PUBLICATIONS

China National Intellectual Property Administration, First Office Action in Chinese Patent Application No. 201510757842.6 (dated Jan. 3, 2019).

* cited by examiner

*Primary Examiner* — Peter D. Mulcahy
(74) *Attorney, Agent, or Firm* — Leydig, Voit & Mayer, Ltd.

(57) ABSTRACT

The present invention relates to a polyamide moulding compound which consists of a blend of two specific polyamides. The first polyamide is thereby based substantially on 1,5-pentanediamine as diamine component used during polycondensation. The second polyamide is thereby polyamide 6I/6T. The polyamide moulding compounds according to the invention are distinguished by extremely low shrinkage and low differential shrinkage (difference between shrinkage of the moulded article longitudinally and transversely relative to the injection flow). In addition, the present invention relates to moulded articles which are producible from the polyamide moulding compounds according to the invention and also to purposes of use of the polyamide moulding compounds.

12 Claims, No Drawings

POLYAMIDE MOULDING COMPOUND, MOULDED ARTICLE PRODUCED HEREFROM AND ALSO PURPOSES OF USE

CROSS-REFERENCE TO A RELATED APPLICATION

This patent application claims the benefit of European Patent Application No. 14 192 659.2, filed Nov. 11, 2014, which is hereby incorporated by reference in its entirety.

The present invention relates to a polyamide moulding compound which consists of a blend of two specific polyamides. The first polyamide is thereby based substantially on 1,5-pentanediamine as diamine component used during polycondensation. The second polyamide is thereby a partially aromatic polyamide. The polyamide moulding compounds according to the invention are distinguished by extremely low shrinkage and low differential shrinkage (difference between shrinkage of the moulded article longitudinally and transversely relative to the injection flow). In addition, the present invention relates to moulded articles which are producible from the polyamide moulding compounds according to the invention and also to purposes of use of the polyamide moulding compounds.

Various polyamide compositions in which the diaminic component of the polyamide is derived from cadaverine (1,5-pentanediamine) are known in the state of the art. Such polyamide compositions are produced and marketed in particular from the standpoint of ecologically sustainable polyamides.

WO 2009/0954401 A1 relates to transparent moulding compounds based on polyamide 510 with a transmission measured according to ASTM D 1003 on 1 mm thick, injection-moulded sheets of greater than or equal to 80% and a method and master batches for the production of such moulding compounds and also the use of such moulding compounds for the production of moulded articles of any type. In order to increase the transparency, preferred embodiments comprise nucleation agents.

JP 2010/270308 describes thermoplastic compositions based on polyamide 5X and further polymers which are electrically conductive. The further polymers used as blend component are polyolefins (the copolyamide 6I/6T is in fact listed under test 9 in the experimental part, however a blend with PA 5X is not described.

JP 2004075932 A2 relates to high-molecular polyamide PA 56 and also a suitable production method for this polyamide. Mixtures with other polyamides are not mentioned.

U.S. Pat. No. 2,130,948 mentions, in table 1, the polyamide PA 56 and also a series of further homopolyamides based on pentanediamine.

US 2011/0020628 A1 relates to fibres made of PA 56 and production thereof.

US 2009/0099318 A1 describes copolyamides PA 56/6 (97-75/3-25% by mol).

EP 2687555 A1 relates to copolyamides PA 56/66; in tables 2 and 3, PA 56 is mentioned. In table 3, with the comparative examples 12 and 13, moulding compounds reinforced with 50% glass fibres with a matrix of PA 56 are processed.

EP 1 757636 A1 describes copolyamides PA 56/66 (95-5/5-95), PA 56 being listed as reference.

However, such polyamide moulding compounds still have a tendency towards considerable shrinkage.

It is therefore the object of the present invention to improve further the polyamides which are known from the state of the art and derived from cadaverine with respect to their high tendency towards shrinkage and differential shrinkage so that essentially dimensionally-stable, low-distortion or distortion-free moulded articles can be produced herefrom.

The object is achieved, with respect to the polyamide moulding compound, by the features of patent claim 1, by a moulded article having the features of patent claim 17 and also, with respect to purposes of the use, by the features of patent claim 18. Preferred embodiments are mentioned in the dependent patent claims.

The invention hence relates to a polyamide moulding compound, comprising or consisting of a blend of
   a) 50 to 90 parts by weight of at least one polyamide, obtainable by polycondensation,
      of 1,5-pentanediamine or of a mixture of at least two diamines, 1,5-pentanediamine constituting at least 70% by mol of the mixture, with
      at least one dicarboxylic acid with 4 to 36, preferably 6 to 18 and particularly preferably 6 to 12, carbon atoms or a mixture of at least two dicarboxylic acids with 4 to 36, preferably 6 to 18 and particularly preferably 6 to 12, carbon atoms, and also
   b) 10 to 50 parts by weight of at least one partially aromatic polyamide,
components a) and b) adding up to 100 parts by weight.

In addition to the mentioned components a) and b), the polyamide moulding compound comprises 10 to 250 parts by weight of fibres as component c).

The content of fibres hence adds up to 100 parts by weight which constitute components a) and b).

The polyamide moulding compound according to the invention can comprise the mentioned components a) to c) so that also further compounds, components or constituents can be included in the polyamide moulding compound.

Likewise, it is however possible that the polyamide moulding compound consists of components a) to c) so that no further compounds or compounds, components or constituents are contained.

In addition, the polyamide moulding compounds can comprise 0 to 100 parts by weight of at least one additive (component d)). The invention likewise provides that for example exclusively a single additive or a limited number of special additives is included in the moulding compound. It is likewise possible that, apart from the at least one additive d) or the exclusively one additive or the limited number of special additives, no further compounds, components or constituents are included in the polyamide moulding compound so that, in this case, the polyamide moulding compound consists of components a) to d).

Alternatively or additionally to the previously mentioned embodiment, it is likewise possible that the polyamide moulding compounds according to the invention comprise 0 to 100 parts by weight of at least one polymer (component e)) which is different from a) and b). It is hereby likewise possible that the polyamide moulding compounds are formed, i.e. consist, of components a) to c) and e) or of components a) to e), the previous definition being adopted for the understanding of component c).

An embodiment in which the polyamide moulding compounds according to the invention are formed from components a) to c) and also d) and/or e) is particularly preferred.

The moulding compounds of the state of the art have, relative to the moulding compounds according to the invention, a differential shrinkage which is higher by at least 20% if a similar reinforcement (type of fibre, concentration) forms the basis of the moulding compounds. There is thereby understood by differential shrinkage, the difference between linear injection shrinkage transversely and longitudinally relative to the injection direction. The linear injection shrinkage is determined longitudinally/transversely, according to ISO 294-4, on a sheet, type D2, 60×60×2 mm (according to standard ISO 294-3). The sheets are stored before measurement for either 24 hours (24 h) at 23° C. in a dry atmosphere, i.e. over silica gel, or for 14 days (14 d) in normal room conditions (23° C., 50% relative humidity). The processing shrinkage was determined longitudinally and transversely relative to the flow direction of the moulding compound melt injected during injection moulding relative to the size of the mould cavity. The arithmetic average of the measurements on 5 sheets is indicated.

Polyamide a) hence comprises, as diaminic component, a component derived from 1,5-pentanediamine. Preferably, the diaminic component of polyamide a) is thereby formed from 1,5-pentanediamine up to 100%.

Further diamines which can be included, in addition to 1,5-pentadiamine, in polyamide a), are selected from the group consisting of 1,4-butanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, 1,3-bis(aminomethyl)cyclohexane, bis(4-amino-3-methyl-cyclohexyl)methane, bis-4-amino-cyclohexyl)methane, bis(4-amino-3-ethyl-cyclohexyl)methane, bis(4-amino-3,5-di-methyl-cyclohexyl)methane, 2,6-norbornanediamine, 2,6-bis(aminomethyl)norbornane, 1,3-cyclohexanediamine, 1,4-cyclohexanediamine, isophoronediamine, m-xylylenediamine and p-xylylenediamine, 1,6-hexanediamine and 1,10-decanediamine being particularly preferred.

Polyamide a) can be produced from the following dicarboxylic acids: adipic acid, suberic acid, azeleic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, C36-dimer fatty acid, isophthalic acid, terephthalic acid, naphthalenedicarboxylic acid, cis- and/or trans-cyclohexane-1,4-dicarboxylic acid and/or cis- and/or trans-cyclohexane-1,3-dicarboxylic acid (CHDA) and mixtures thereof.

Component a) thereby constitutes at least half relative to the parts by weight of the polyamide mixture of a) and b). Components a) and b) add up to 100 parts by weight. The possibility exists that the polyamide moulding compound is formed merely from polyamides a) and b). However, the possibility is likewise given that the polyamide moulding compound also includes further components in addition to polyamides a) and b).

According to a preferred embodiment, the dicarboxylic acid is an aliphatic dicarboxylic acid with 6 to 18, in particular with 6 to 12, carbon atoms, preferably a linear aliphatic dicarboxylic acid with 6 to 18, in particular with 6 to 12, carbon atoms, particularly preferably a linear aliphatic dicarboxylic acid with 6, 8, 10 or 12 carbon atoms. Accordingly, in particular the dicarboxylic acids, adipic acid, suberic acid, sebacic acid and dodecanedioic acid are preferred.

In particular, preferably exclusively 1,5-pentanediamine is used as diamine component, in addition to the above-mentioned dicarboxylic acids, for the polycondensation, i.e. polyamide a) is derived merely from 1,5-pentanediamine, with respect to the diamine component.

According to an alternative embodiment, it is however likewise possible that, in addition to 1,5-pentanediamine, also at least one further diamine is present, which is used in the mixture with 1,5-pentanediamine for the polycondensation for the reaction. In this case, it is advantageous if the proportion of 1,5-pentanediamine in the mixture of the at least two diamines is at least 80% by mol to 99% by mol, preferably at least 90% by mol to 95% by mol.

In particular, it is preferred if polyamide a) is a polyamide 5X, "5" representing 1,5-pentanediamine and "X" being a linear aliphatic dicarboxylic acid with 4-12 carbon atoms. For particular preference, polyamide a) is selected from polyamide 56, polyamide 58, polyamide 510 or 512. Both merely a single one of the previously-mentioned polyamides can hereby be contained in the moulding compound and mixtures of 2 or more of the previously-mentioned polyamides.

Preferred partially aromatic polyamides b) are thereby, for example polyamide 5I, polyamide 6I, polyamide DI, polyamide 5I/5T, polyamide 6I/6T, polyamide DI/DT, polyamide 5I/5T/6I/6T, polyamide 5I/5T/DI/DT, polyamide 6I/6T/DI/DT and also mixtures, blends or combinations hereof. "D" hereby means 2-methylpentane-1,5-diamine. Polyamide 6I/6T and polyamide 5I/5T, in particular polyamide 6I/6T, are particularly preferred.

In the case of at least one partially aromatic polyamide b), it is preferred if the molar ratio of isophthalic acid to the sum of isophthalic acid and terephthalic acid is from 50 to 100% by mol, preferably from 60 to 80% by mol, particularly preferably from 65 to 75% by mol. A ratio of I/(I+T)=100% hereby means that exclusively isophthalic acid is used in the corresponding polyamide b). Here also, the possibility is included that merely a single polyamide b) is included in the moulding compound. Likewise, it is conceivable that two different polyamides b), e.g. two different polyamides 6I/6T with different mixture ratios of the proportions of 6I/6T units, are included in the moulding compound. Also the possibility of using a plurality of chemically different polyamides b), e.g. mixtures of polyamide 6I/6T and polyamide 5I/5T, is conceivable.

Preferred relative viscosities of the polyamide or polyamides a) are thereby in the range of 1.5 to 3.0, preferably of 1.6 to 2.4, particularly preferably of 1.65 to 1.95.

Alternatively or additionally hereto, it is likewise of advantage if the polyamide or polyamides b) have a relative viscosity of 1.40 to 2.20, preferably of 1.45 to 1.75.

Determination of the relative viscosity of the polyamides a) and b) is thereby effected according to DIN EN ISO 307 on solutions of 0.5 g polymer, dissolved in 100 ml m-cresol at a temperature of 20° C. Granulate is used as sample.

A further embodiment of the present invention provides that the polyamide moulding compound according to the invention comprises preferably in addition, relative to 100 parts by weight of the blend of polyamides a) and b), 20 to 180 parts by weight of fibres, in particular fibres, or the moulding compound consists hereof, possibly also exclusively also the above-mentioned components d) and/or e) being able to be contained or not.

Preferred fibres c) are thereby selected from the group consisting of glass fibres, carbon fibres, metal fibres, aramide fibres and also mixtures or combinations hereof.

In particular, glass fibres are particularly preferred components of the polyamide moulding compound.

Preferably, the fibres are thereby either glass fibres with a circular cross-section (round glass fibres) or glass fibres with a non-circular cross-section (flat glass fibres). The present invention also comprises embodiments in which both types of glass fibres, i.e. glass fibres with a circular cross-section and glass fibres with a non-circular cross-section, are included in the polyamide moulding compound.

Preferably, the glass fibres (i.e. both the glass fibres with a circular cross-section and the glass fibres with a non-circular cross-section) are short fibres. Preferred embodiments of short fibres provide that the glass fibres are present as cut glass, the length of the cut glass is hereby 0.2 to 20 mm.

Alternatively and likewise preferably, the glass fibres can also be present as endless fibres, such endless fibres are also described technically as rovings. Embodiments are likewise conceivable in which both endless fibres and short fibres are contained.

In particular, the glass fibres represent E-glass fibres. Such E-glass fibres are defined according to ASTM D578-00. This definition is also adopted for the purposes of the present invention. These E-glass fibres have in particular a non-circular cross-section, the dimensional ratio of the main cross-sectional axis to the subsidiary cross-sectional axis which is at right angles thereto being preferably more than 2.5, for further preference being in the range of 2.5 to 6, in particular in the range of 3 to 5.

Glass fibres with a circular cross-section preferably have a diameter of 5 to 20 μm, preferably 5-15 μm, particularly preferably of 5 to 10 μm.

Glass fibres with a non-circular cross-section (flat glass fibres) preferably have dimensioning of the main cross-sectional axis in the range of 10 to 35 μm, in particular in the range 18 to 32 μm and a length of the subsidiary cross-sectional axis in the range of 3 to 15 μm, in particular in the range of 4 to 10 μm.

Furthermore, it is preferred that the polyamide moulding compound according to the invention comprises in addition 0.1 to 100 parts by weight, preferably 0.5 to 70 parts by weight and particularly preferably 1-30 parts by weight, of at least one additive d) or—in the sense of the above-indicated definition—consists hereof.

In particular, this additive can thereby concern whiskers, talcum, mica, silicates, quartz, titanium dioxide, wollastonite, kaolin, silicic acids, magnesium carbonate, magnesium hydroxide, chalk, ground or precipitated calcium carbonate, lime, feldspar, barium sulphate, permanent-magnetic or magnetisable metals or alloys, glass balls, hollow glass balls, hollow-ball silicate fillers, natural layer silicates, synthetic layer silicates, inorganic stabilisers, organic stabilisers, lubricants, dyes, metallic pigments, metal tinsel, metal-coated particles, halogen-containing flame retardants, halogen-free flame retardants, impact strength modifiers, antistatic agents, conductivity additives, in particular carbon black and/or carbon nanotubes, mould-release agents, optical brighteners or mixtures hereof.

Alternatively or additionally hereto, it is likewise possible that the polyamide moulding compound according to the invention comprises in addition 0.1 to 100 parts by weight, preferably 0.5 to 70 parts by weight and particularly preferably 1-30 parts by weight, of at least one further polymer e) which is different from polymers a) and b). In the sense of the above-indicated definition, the polyamide moulding compound can likewise be formed from components a) to d).

Polymer e) preferably concerns a thermoplastic material selected from the following group:

Polyamide (different from a) and b)), polycarbonate, polyphenylene ether, polystyrene, polymethylmethacrylate, acrylonitrile-butadiene-styrene copolymer, acrylonitrile-styrene copolymer, polyolefin, polyoxymethylene, polyester, in particular polyethylene terephthalate, polybutylene terephthalate, polysulphone (in particular of the PSU, PESU, PPSU type), polyphenylene sulphide, liquid-crystalline polymers, polyether ketone, polyether ether ketone, polyimide, polyester amide, polyether ester amide, polyamide imide, polyester imide, polyether amide, polyurethane (in particular of the TPU, PUR type), polysiloxane, polyacrylate, polymethacrylate and also mixtures or copolymers based on such systems.

In order to enable particularly low differential shrinkage of the moulding compound according to the invention, it is preferred in particular if the polyamide moulding compound comprises no polymers which are different from a) and b), i.e. is free from polymer e).

In addition, the invention relates to a moulded article which can be produced from a previously-defined moulding compound or is formed herefrom. Preferred moulded articles are thereby automobile moulded parts, mobile phone housings and casings of electrical cables.

The moulded articles produced from the moulding compounds according to the invention are used for the production of interior and exterior parts, preferably with a load-bearing or mechanical function in the field of electrics, electronics, furniture, sport, mechanical engineering, sanitary and hygiene, medicine, energy and drive technology, automobile and other means of transport or housing-, frame- or load-bearing material for appliances and apparatus for telecommunications (e.g. mobile phone), consumer electronics, personal computers, tablets, phablets, household appliances, mechanical engineering, heating field, or attachment parts for installations or for containers and fan parts of all types. There may be mentioned as possible applications for the moulded articles produced from the moulding compounds according to the invention, above all the field of metal diecasting replacement in which extremely high rigidity in combination with good toughness is expected.

The invention relates in addition to the use of the moulding compound for the production of the previously-mentioned moulded articles.

The present invention is described further with reference to the subsequently indicated examples without restricting the invention to the preferred embodiments. The test results are compiled in the subsequent tables.

The meanings in the tables are:

GF: The polyamide moulding compounds comprise 50% by weight of glass fibres with a round cross-section (cut glass fibres Vetrotex 995 made of E-glass, with a length of 4.5 mm and a diameter of 10 μm (circular cross-section), manufacturer: Owens Corning Fiberglas)

XGF: The polyamide moulding compounds comprise 50% by weight of glass fibres with a non-circular cross-section (flat cross-section) (Nittobo CSG3PA-820, 3 mm long, 28 μm wide, 7 μm thick, aspect ratio of the cross-sectional axes=4, Nittobo, Japan (flat glass fibres))

Longitudinally: The distortion was measured in the direction of the injection moulding of the moulded part Transversly: The distortion was measured in 90° direction relative to the injection moulding direction 24 h: The investigated samples were stored before measurement for 24 hours (24 h) at 23° C. in a dry environment, i.e. over silica gel 14 d NC: The investigated samples were stored before measurement for 14 days (14 d) in normal room conditions (23° C., 50% relative humidity)

In the subsequent tests, the following components were used:

PA 66:

Polyamide PA 66 is a polycondensation product made of 1,6-hexanediamine and adipic acid; Radipol A45, solution viscosity of $\eta_{rel}$=1.86, melting point $T_m$=260° C., RADICI, Italy

PA 56:

Polyamide 56 is a polycondensation product made of 1,5-pentanediamine and adipic acid; Terryl 56, relative viscosity $\eta_{rel}$=1.88, melting point $T_m$=254° C., Cathay, China

PA 410:

Polyamide PA 410 is a polycondensation product made of 1,4-butanediamine and sebacic acid, relative viscosity $\eta_{rel}$=2.01, melting point
$T_m$=250° C.

PA 510:

Polyamide PA 510 is a polycondensation product made of 1,5-pentanediamine and sebacic acid; Terryl 510, relative viscosity $\eta_{rel}$=1.98, melting point $T_m$=218° C., Cathay China Polyamide PA 6I/6T:

Polyamide 6I/6T is a polycondensation product of 1,6-hexanediamine, isophthalic acid and terephthalic acid with a molar ratio of isophthalic acid/terephthalic acid=2:1, relative viscosity $\eta_{rel}$=1.52, glass transition temperature $T_g$=125° C.

From the above-mentioned aliphatic polyamides (PA 66, PA 56, PA 410 and PA 510), the partially aromatic polyamide PA 6I/6T and the glass fibres, compounds reinforced respectively with 50% by weight of glass fibres in which the polyamides a) and b) are present in the ratio of 3:1 were produced and investigated with respect to their mechanical properties. For this purpose, the components indicated in tables 1 to 3 were compounded in the above-mentioned concentrations in a twin-shaft extruder of the company Werner and Pfleiderer with a screw diameter of 25 mm with the prescribed process parameters (cylinder temperatures: rising from 250 to 280° C.; speed of rotation: 250 rpm; throughput: 12 kg/h). The polyamide granulates were hereby metered into the feed zone whilst the glass fibres were metered via a side feeder 3 housing units in front of the nozzle into the polymer melt. The compounds were withdrawn as a strand from a nozzle with a 3 mm diameter and granulated after water cooling. The granulate was dried for 24 hours at 110° C. in a vacuum of 30 mbar. The compounds were thus injected then with an injection moulding machine, Arburg Allrounder 320-210-750, to form test pieces at cylinder temperatures of 290 to 310° C. and a mould temperature of 120° C. (sheets, type D2, 60×60×60×2 mm) or injected at 100° C. (remaining test pieces).

The measurements were implemented according to the following standards and on the following test pieces:

Unless otherwise noted, the test pieces are used in the dry state, i.e. after injection moulding, they are stored for at least 24 h at room temperature in a dry environment, i.e. over silica gel.

The thermal behaviour (melting point $T_m$), melt enthalpy ($\Delta H_m$), glass transition temperature ($T_g$)) was determined on the granulate by means of the ISO Standard 11357-1/-2. The differential scanning calorimetry (DSC) was implemented at a heating rate of 20° C./min.

The relative viscosity ($\eta_{rel}$) (was determined according to DIN EN ISO 307, on solutions of 0.5 g polymer dissolved in 100 ml m-cresol at a temperature of 20° C. Granulate is used as sample.

Modulus of elasticity in tension, breaking strength and breaking elongation: Modulus of elasticity in tension, breaking strength and breaking elongation were determined according to ISO 527 at a tensile speed of 1 mm/min (modulus of elasticity in tension) or at a tensile speed of 5 mm/min (breaking strength, breaking elongation) on the ISO tension test bar, Standard ISO/CD 3167, type AI, 170×20/10×4 mm at a temperature of 23° C.

Impact strength and notch impact strength according to Charpy were measured according to ISO 179/keU on the ISO test piece, Standard ISO/CD 3167, Type B1, 80×10×4 mm at a temperature of 23° C.

The processing shrinkage (shrinkage longitudinally/transversely or linear injection shrinkage longitudinally/transversely) was determined according to ISO 294-4 on a sheet, type D2, 60×60×2 mm (according to Standard ISO 294-3). The sheets were produced with the previously-indicated compound- and mould temperatures. They were stored before the measurement for either 24 hours (24 h) at 23° C. in a dry environment, i.e. over silica gel, or for 14 days (14 d) in normal room conditions (23° C., 50% relative humidity). The processing shrinkage was determined longitudinally and transversely relative to the flow direction of the moulding compound melt injected during injection moulding relative to the size of the mould cavity. The arithmetic average from the measurements on 5 sheets is indicated. The differential shrinkage is produced from the difference of the shrinkage transversely (linear injection shrinkage transversely) and the shrinkage longitudinally (linear injection shrinkage longitudinally).

The following measurement values were hereby obtained:

TABLE 1

| Examples | CE1a | CE1b | E1a | E1b | CE2a | CE2b | E2a | E2b |
|---|---|---|---|---|---|---|---|---|
| Matrix polymer | PA 66/ PA 6I/6T | | PA 56/ PA 6I/6T | | PA 410/ PA 6I/6T | | PA 510/ PA 6I/6T | |
| Glass fibre | GF | XGF | GF | XGF | GF | XGF | GF | XGF |
| Shrinkage longitudinally 24 h [%] | 0.09 | 0.06 | 0.04 | 0.01 | 0.12 | 0.08 | 0.03 | −0.03 |
| Shrinkage transversely 24 h [%] | 0.85 | 0.48 | 0.58 | 0.32 | 0.87 | 0.51 | 0.34 | 0.15 |
| Differential shrinkage 24 h [%] | 0.76 | 0.42 | 0.54 | 0.31 | 0.75 | 0.43 | 0.31 | 0.18 |
| Shrinkage longitudinally 14 d NC [%] | 0.08 | 0.05 | 0.02 | −0.01 | 0.1 | 0.07 | 0.02 | 0.09 |
| Shrinkage transversely 14 d NC [%] | 0.80 | 0.45 | 0.53 | 0.28 | 0.81 | 0.49 | 0.29 | 0.24 |
| Differential shrinkage 14 d NC [%] | 0.72 | 0.40 | 0.51 | 0.29 | 0.80 | 0.42 | 0.27 | 0.15 |
| Modulus of elasticity [GPa] | 16.0 | 16.7 | 16.3 | 16.6 | 15.2 | 15.7 | 14.0 | 14.3 |
| Breaking strength [MPa] | 243 | 255 | 256 | 251 | 225 | 232 | 157 | 167 |

TABLE 1-continued

| Examples | CE1a | CE1b | E1a | E1b | CE2a | CE2b | E2a | E2b |
|---|---|---|---|---|---|---|---|---|
| Breaking elongation [%] | 3.1 | 2.7 | 3.0 | 2.6 | 3.7 | 2.8 | 3.4 | 2.7 |
| Impact strength (charpy 23°) [kJ/m$^2$] | 113 | 96 | 103 | 103 | 101 | 96 | 83 | 92 |
| Impact strength (charpy −30°) [kJ/m$^2$] | 115 | 92 | 109 | 93 | 118 | 82 | 89 | 85 |
| Notch impact strength (charpy 23°) [kJ/m$^2$] | 15.6 | 18.3 | 15.6 | 20.3 | 14.2 | 15.9 | 15.8 | 18.5 |
| Notch impact strength (charpy −30°) [kJ/m$^2$] | 14.1 | 19.3 | 15.4 | 20.8 | 14.3 | 17.1 | 14.2 | 15.4 |

As is evident from the tests, the blends according to the invention which are based on polyamide 56 (E1a, E1b) or polyamide 510 (E2a, E2b) show significantly reduced values with shrinkage with otherwise comparable mechanical properties. The distortion of such moulded articles appears hence to be significantly less, the dimensional stability of such moulded articles is hence improved. The differential shrinkage (24 h) for comparative examples CE1a and CE1b in which PA 56 was replaced by PA 66, was, for the reinforcement with glass fibres round in cross-section (50% by weight) was above the values of the corresponding moulding compound according to the invention based on the mixture of PA 56 and PA 6I/6T by 40% (E1a) and, for the reinforcement with glass fibres flat in cross-section (50% by weight), by 43% (E1b). The difference in the differential shrinkage appears even more clearly if, in the moulding compound based on PA 410/PA 6I/6T (CE2a, CE2b), the PA 410 is replaced by PA 510. Thus the differential shrinkage (24 h) for CE2a is increased compared with E2a by 129% and for CE2b compared with E2b by 139%.

TABLE 2

| | Examples | | | |
|---|---|---|---|---|
| | E3a | E3b | CE3a | CE3b |
| Polymer matrix | PA 56/PA 6I/6T | | PA 56 | |
| Glass fibre | GF | XGF | GF | XGF |
| Shrinkage longitudinally [%] | 0.04 | 0.01 | 0.17 | 0.07 |
| Shrinkage transversely [%] | 0.58 | 0.32 | 0.82 | 0.54 |
| Differential shrinkage [%] | 0.54 | 0.31 | 0.65 | 0.47 |
| Modulus of elasticity [GPa] | 16.3 | 16.6 | 15.8 | 15.6 |
| Breaking strength [MPa] | 256 | 251 | 235 | 235 |
| Breaking elongation [%] | 3.0 | 2.6 | 3.1 | 2.6 |
| Impact strength (charpy 23°) [kJ/m$^2$] | 103 | 103 | 101 | 84 |
| Impact strength (charpy −30°) | 109 | 93 | 75 | 68 |
| Notch impact strength (charpy 23°) [kJ/m$^2$] | 15.6 | 20.3 | 11.2 | 14.1 |
| Notch impact strength (charpy −30°) [kJ/m$^2$] | 15.4 | 20.8 | 13.4 | 14.7 |

As is evident from table 2, the addition of polyamide 6I/6T to polyamide 56 effects a notable reduction in shrinkage both longitudinally and transversely relative to the injection direction. For the moulding compounds with a matrix consisting of polyamide PA 56 (CE3a, CE3b), the result is a differential shrinkage (24 h) which is increased, compared with the moulding compound PA 56/PA 6I/6T according to the invention, for the reinforcement with glass fibres round in cross-section (50% by weight) by 20% (E3a) and, for the reinforcement with glass fibres flat in cross-section (50% by weight), by 50% (E3b).

TABLE 3

| | Examples | | | |
|---|---|---|---|---|
| | E4a | E4b | CE4a | CE4b |
| Polymer matrix | PA 510/PA 6I/6T | | PA 510 | |
| Glass fibre | GF | XGF | GF | XGF |
| Shrinkage longitudinally [%] | 0.03 | −0.03 | 0.24 | 0.05 |
| Shrinkage transversely [%] | 0.33 | 0.16 | 0.59 | 0.43 |
| Differential shrinkage [%] | 0.30 | 0.19 | 0.35 | 0.38 |
| Breaking elongation [%] | 3.4 | 2.7 | 3.5 | 2.9 |
| Impact strength (charpy 23°) [kJ/m$^2$] | 83 | 92 | 89 | 86 |
| Impact strength (charpy −30° C.) [kJ/m$^2$] | 89 | 85 | 91 | 93 |
| Notch impact strength (charpy 23°) [kJ/m$^2$] | 15.8 | 18.5 | 14.7 | 17.1 |
| Impact strength (charpy −30°) | 14.2 | 15.4 | 13.4 | 16.4 |

As is evident from table 3, the addition of polyamide 6I/6T to polyamide 510 (E4a, E4b) effects a notable reduction in shrinkage both longitudinally and transversely relative to the injection direction. For the moulding compounds with a matrix consisting of polyamide PA 510 (CE4a, CE4b), the result is a differential shrinkage (24 h) which is increased, compared with the moulding compound PA 510/PA 6I/6T according to the invention, for the reinforcement with glass fibres round in cross-section (50% by weight), by 26% (E4a) and, for the reinforcement with glass fibres flat in cross section (50% by weight) by 100% (E4b).

All the measurement values indicated in tables 2 and 3 were determined on samples which were stored before measurement at 23° C. for 24 hours (24 h) in a dry environment, i.e. over silica gel.

The invention claimed is:

1. A polyamide moulding compound, comprising a blend of
    a) 50 to 90 parts by weight of at least one polyamide represented by the formula "5X", wherein "5" is 1,5-pentanediamine and "X" is a linear aliphatic dicarboxylic acid with 4-12 carbon atoms, and
    b) 10 to 50 parts by weight of at least one partially aromatic polyamide selected from the group consisting of polyamide 6I, polyamide 5I/5T, polyamide 6I/6T, and polyamide 5I/5T/6I/6T,
    components a) and b) adding up to 100 parts by weight and the polyamide moulding compound comprising, in addition, relative to 100 parts by weight of the blend of polyamides a) and b),
    c) 10 to 250 parts by weight of fibres,
    d) 0 to 100 parts by weight of at least one additive, and/or
    e) 0 to 100 parts by weight of at least one polymer which is different from a) and b);
    wherein the fibres c) are glass fibres with non-circular cross-section.

2. The polyamide moulding compound according to claim 1, wherein the at least one polyamide a) is polyamide 56 or polyamide 510 and the at least one partially aromatic polyamide b) is polyamide 6I/6T wherein the molar ratio of isophthalic acid to the sum of isophthalic acid and terephthalic acid is from 50 to 100% by mol.

3. The polyamide moulding compound according to claim 1, wherein
   a) the at least one polyamide a) has a relative viscosity determined according to DIN EN ISO 307 on solutions of 0.5 g polymer, dissolved in 100 ml m-cresol at a temperature of 20° C., of 1.5 to 3.0, and/or
   b) the at least one polyamide a) has a relative viscosity, measured according to DIN EN ISO 307 on solutions of 0.5 g polymer, dissolved in 100 ml m-cresol at a temperature of 20° C., of 1.40 to 2.20.

4. The polyamide moulding compound according to claim 1, wherein the polyamide moulding compound comprises 20 to 180 parts by weight of fibres.

5. The polyamide moulding compound according to claim 1, wherein the glass fibres are E-glass fibres according to ASTM D578-00.

6. The polyamide moulding compound according to claim 1, wherein the glass fibres have dimensioning of the main cross-sectional axis in the range of 10 to 35 µm and the dimension of the subsidiary cross-sectional axis is in the range of 3 to 15 µm.

7. The polyamide moulding compound according to claim 1, wherein the polyamide moulding compound comprises 0.1 to 100 parts by weight of at least one additive.

8. The polyamide moulding compound according to claim 7, wherein the at least one additive is selected from the group consisting of whiskers, talcum, mica, silicates, quartz, titanium dioxide, wollastonite, kaolin, silicic acids, magnesium carbonate, magnesium hydroxide, chalk, ground or precipitated calcium carbonate, lime, feldspar, barium sulphate, permanent-magnetic or magnetisable metals or alloys, glass balls, hollow glass balls, hollow-ball silicate fillers, natural layer silicates, synthetic layer silicates, inorganic stabilisers, organic stabilisers, lubricants, dyes, metallic pigments, metal tinsel, metal-coated particles, halogen-containing flame retardants, halogen-free flame retardants, impact strength modifiers, antistatic agents, conductivity additives, carbon black and/or carbon nanotubes, mould-release agents, optical brighteners and mixtures thereof.

9. The polyamide moulding compound according to claim 1, wherein the polyamide moulding compound comprises 0.1 to 100 parts by weight of at least one polymer d) which is different from a) and b).

10. The polyamide moulding compound according to claim 9, wherein the at least one polymer d) which is different from a) and b) is a thermoplastic material selected from the group consisting of polyamide which is different from a) and b), polycarbonate, polyphenylene ether, polystyrene, polymethylmethacrylate, acrylonitrile-butadiene-styrene copolymer, acrylonitrile-styrene copolymer, polyolefin, polyoxymethylene, polyester, polyethylene terephthalate, polybutylene terephthalate, polysulphone, PSU, PESU, PPSU, polyphenylene sulphide, liquid-crystalline polymers, polyether ketone, polyether ether ketone, polyimide, polyester amide, polyether ester amide, polyamide imide, polyester imide, polyether amide, polyurethane, polysiloxane, polyacrylate, polymethacrylate and mixtures or copolymers thereof.

11. A moulded article, formed from a moulding compound according to claim 1, in the form of interior and exterior parts in the field of electrics, electronics, furniture, sport, mechanical engineering, sanitary and hygiene, medicine, energy and drive technology, automobile and other means of transport, automobile moulded parts, housing-, frame- or load-bearing material for appliances and apparatus for telecommunications, mobile phone housings, consumer electronics, personal computers, tablets, phablets, household appliances, mechanical engineering, heating field, or attachment parts for installations or containers and fan parts or casings of electrical cables.

12. A polyamide moulding compound consisting of components a) to d), wherein a blend is formed of
   a) 50 to 90 parts by weight of at least one polyamide represented by the formula "5X", wherein "5" is 1,5-pentanediamine and "X" is a linear aliphatic dicarboxylic acid with 4-12 carbon atoms, and
   b) 10 to 50 parts by weight of at least one partially aromatic polyamide selected from the group consisting of polyamide 6I, polyamide 5I/5T, polyamide 6I/6T, and polyamide 5I/5T/6I/6T,
   components a) and b) adding up to 100 parts by weight of the blend, and relative to 100 parts by weight of the blend of polyamides a) and b), the moulding compound contains components c) and d),
   c) 10 to 250 parts by weight of fibres, and
   d) 0 to 100 parts by weight of at least one additive,
   wherein the fibres c) are glass fibres with non-circular cross-section.

* * * * *